United States Patent [19]
Zimmerman

[11] 3,884,853
[45] May 20, 1975

[54] ALKALI-CURABLE CATIONIC/ANIONIC STARCH FOR PAPER COATING BINDERS

[75] Inventor: Jerrel L. Zimmerman, Decatur, Ill.

[73] Assignee: A. E. Staley Manufacturing Company, Decatur, Ill.

[22] Filed: Nov. 14, 1973

[21] Appl. No.: 415,913

[52] U.S. Cl...... 260/17.3; 117/155 L; 117/155 UA; 117/161 LN; 117/161 UZ; 260/17.4 ST; 260/233.3
[51] Int. Cl............................................. C08b 25/02
[58] Field of Search.......... 260/17.3, 233.3, 17.4 ST

[56] References Cited
UNITED STATES PATENTS
| | | | |
|---|---|---|---|
| 3,395,072 | 7/1968 | Talet et al............ | 260/17.4 |
| 3,467,647 | 9/1969 | Benning................ | 260/17.4 |
| 3,730,925 | 5/1973 | Kovats.................. | 260/17.4 |

*Primary Examiner*—Morris Liebman
*Assistant Examiner*—Edward Woodberry
*Attorney, Agent, or Firm*—Howard J. Barnett; Charles J. Meyerson

[57] ABSTRACT

An alkali-stable, modified starch for use in paper coating binders as a replacement for protein (casein and delta protein) over a broad pH ranging from 6 to about 9.5, when ammonia is used to adjust pH. A cationic starch derivative having quaternary ammonium groups is reacted with maleic anhydride to yield an amphoteric starch having a net anionic charge. This product insolubilizes with conventional starch insolubilizers, such as melamine formaldehyde resin, at pH of 6 and higher to produce wet-rub resistant coatings when formulated with clay and coated on paper and paperboard substrates. Crosslinking is effected rapidly to produce complete insolubilization, especially when used with a minimum of 50% latex as a binder.

Maleic anhydride provides anionic properties to the cationic starch molecule to yield an amphoteric starch with a net anionic charge. Maleic anhydride is used because the starch so produced is capable of self-crosslinking at high pHs to produce insolubilized coatings resistant to water. Crosslinking is effected by drying the paste films without the use of a catalyst. When alkaline conditions are required such as when using alkali-swellable latex, pH adjustments are made with ammonia, which flashes off during insolubilization. The maleated starches self-crosslink and insolubilize at high pH levels, and become immobile before water is completely removed. The rapid insolubilization minimizes binder migration.

16 Claims, No Drawings

ALKALI-CURABLE CATIONIC/ANIONIC STARCH FOR PAPER COATING BINDERS

BACKGROUND OF THE INVENTION

Other anionic starches have been made in the past using oxidation or the addition of chloroacetic acid. However, these products do not self-crosslink, and therefore do not insolubilize effectively when used in a paper coating.

Proteins have long been used as binders for paper coatings, particularly in offset, label and food board applications. Such protein binders contribute printability, water-resistance, reduced binder migration and viscosity control to the paper coating. Protein binders have flow properties which adapt well to high speed airknife and trailing blade coaters. However, typical delta-protein based paper coatings function only at alkaline pH, thus limiting their usefulness.

Starch has always been known for its excellent viscosity characteristics, and for its adhesive strength, but it did not provide the required water-resistance, printability and rheology, and prior starch derivatives were sensitive to alkaline pH conditions. Because of these shortcomings of starch, it has never completely replaced casein or protein in wet-rub resistant paper coatings. The ideal starch derivative for coating colors should function well, and insolubilize rapidly over the complete pH range, to be expected in coating processes, from acid to alkaline.

DESCRIPTION OF PRIOR ART

U.S. Pat. No. 2,461,139 describes the preparation of starch maleate using maleic anhydride. U.S. Pat. No. 3,346,563 describes the reaction of starch with a mixed reagent to form quaternary ammonium starch ether. The reagents there described include vicinal chlorohydroxypropyl trimethyl ammonium chloride and vicinal dichloropropyl trimethyl ammonium chloride starch ether.

U.S. Pat. No. 3,719,514 describes an improved wet-rub resistant coating system for paper utilizing an anionic starch which has been reacted with a polyalkylenimine, and which has been oxidized to provide sufficient carboxyl groups to produce a net anionic starch derivative. The starch product contains 0.3 to 4 percent by weight of carboxyl groups based on the starch dry substance and from 0.3 to 20 percent by weight polyalkylenimine having a degree of polymerization ranging from 14 to 100. The above starch binder composition is described for use in acid to neutral pH, ranging from about 4 to about 7. No disclosure is found here of alkaline pH stability.

U.S. Pat. No. 3,063,854 issued to Claxton describes a paper coating composition which includes kaolin clay, an amylaceous adhesive and alkylene polyamines having two strongly basic groups in the polyamine molecule. The Claxton specification primarily is directed to the use of polyamines in paper coating compositions, the "amylaceous" materials used do not include an amphoteric starch. Claxton's examples include hypochlorite oxidized corn starch, dextrinized starch, epoxide modified starch, enzyme converted starch and hydroxyethylated corn starch. He notes that the polyamines were more effective at lower pH levels.

U.S. Pat. No. 3,320,080 issued to Mazzarella et al. describes cationic starch binders for use in water resistant paper coatings. They state that tertiary amino alkyl ethers are preferred but also contemplate difunctional derivatives, so long as the starch derivative is cationic. Example III of Mazzarella et al. points out the "poor results obtained when a variety of non-cationic starch derivatives are utilized."

Benninga describes cationic and anionic substituted starches in general terms in U.S. Pat. No. 3,467,647, and considers these products useful for the production of water-resistant pigment coated paper. The anionic groups comtemplated by Benninga are "carboxyl, a sulphonate, a sulphate or a phosphate group." Included as a method for introducing carboxyl groups is the use of maleic anhydride in the presence of an alkaline catalyst. This patentee further discloses the addition of small amounts of an aldehyde or an aminoplast or phenol resin to produce water resistance in some paper coating applications. The specification does report that when such agents are used, the insolubilization occurs under conditions of high acidity and high temperature, according to conventional practices. Benninga goes on to report he can use his compounds over a pH range from "weakly acid, neutral, to weakly alkaline" by his system of changing the isoelectric point at will. This is understood to mean that the pH range utility is obtained by selection of the kind, balance and D.S. of the basic and acidic groups.

There is no example in this patent which sets forth a coating color formulation using an anionic starch maleate having cationic quaternary ammonium groups, nor is there any description of the anhydride crosslinking phenomena which was observed in connection with the present invention.

Hayes et al. (U.S. Pat. No. 3,719,664) describe a method of acylating starch with dibasic acid anhydrides and forming salts with certain amines at pH 5–7. These starch derivatives may include hydroxy-alkyl groups, and may be starch esters of monocarboxylic acids such as acetic and propionic acid. There is no disclosure here of the use of a cationic starch (quaternary ammonium starch ether) which is then reacted with a dicarboxylic acid anhydride to produce an amphoteric starch having a net anionic charge. There is no mention in Hayes et al. of paper coating, and of the anhydride crosslinking phenomena of applicant's paper coating system.

BRIEF SUMMARY OF THE INVENTION

Applicant has discovered that a cationic starch, having quaternary ammonium group substitution, which is then reacted with a dicarboxylic anhydride such as maleic anhydride in the absence of an alkaline catalyst according to the reaction as generally set forth in Hayes et al., will produce an anionic starch which will perform like protein (casein and delta protein) over a broad pH range (6 to about 9.5) when used in a paper coating composition, and can be used to completely replace protein as a paper coating binder. There is no pigment shock during mixing of the starch maleate and the clay using the amphoteric (anionic) starch of this invention, and crosslinking is effected rapidly to produce complete insolubilization. Crosslinking is effected by drying the films without the use of catalysts. The papers so coated exhibit excellent wet-rub resistance.

DETAILED DESCRIPTION OF THE INVENTION

The following examples illustrate the presently preferred mode of carrying out the invention without limiting its scope.

EXAMPLE I

Starch Preparation

The presently preferred process for making the amphoteric (anionic) starch derivative of the invention is set forth below:

A. CATIONIC STARCH INTERMEDIATE

| Ingredients | Weight in Pounds Dry Substance |
|---|---|
| hydrocycloned yellow dent corn starch | 100 |
| sulfuric acid | 7 |
| sodium carbonate | 4.7 |
| sodium hydroxide | 24.2 |
| chlorohydroxypropyl ammonium chloride (U.S. Patent 3,346,563) | 21.5 |
| chlorine | .5 |
| sodium hydroxide | .67 |
| sodium metabisulfite | .13 |
| antifoaming agent (Hodag antifoam HC-1015) | .11 |
| citric acid | pH adjustment, as required |
| tricalcium phosphate | 0.034 |

1. The starch is slurried in water to give approximately 22.5°Be, at 60°F. slurry (about 41% solids). The temperature of the slurry is adjusted to about 124°F.;
2. While agitating the slurry, the sulfuric acid (60°Be.) is added for acid conversion through jet dilution system at 4 gal./minute, water - 8 gal./minute. The above rate of $H_2SO_4/H_2O$ is maintained while:
   a. turning on water jet until top of the rotameter spindle in the jet dilution system is between 50–60;
   b. adjusting the air pressure so that 4 gal. of 60°Be. $H_2SO_4$ is added per minute.
3. The above acid conversion is carried out for about 6–8 hours at about 124°F. or until a chart point alkali fluidity of 40 ml. at 77°F. using a 20 g. sample and 8.0% sodium hydroxide solution according to the alkali fluidity test described in more detail below;
4. Antifoaming agent is added, and the slurry is agitated even more vigorously while adding 18°Be. sodium carbonate solution to adjust pH to 5–7;
5. The fluidity of the slurry is then measured according to the test method described in more detail below. The target fluidity is from 40–50 ml.;
6. The slurry temperature is then adjusted to 108°–112°F.;
7. Then the chemical reagent, chlorohydroxypropyl quaternary ammonium chloride (described in U.S. Pat. No. 3,346,563), is added, and the alkalinity is adjusted by the slow addition of 14.2°Be. (10%) sodium hydroxide solution so that 10 ml. of slurry requires 9–11 ml. of 0.1 NHCl to neutralize to a phenolphthalein end point while maintaining reaction temperature at 108°–112°F.;
8. Two hours after the initial alkalinity adjustment (referred to in paragraph 7 above), the alkalinity is adjusted as necessary with additional 14.2°Be. sodium hydroxide to the 9–11 ml. titer level;
9. Ten hours after the initial alkalinity adjustment (referred to in paragraph 7 above) the S.F. green dye test (described in more detail below) is used to determine whether the starch granules are cationic (green dye color transmission by the granules indicates cationic starch). Alkalinity is maintained at a 9–11 titer (as above in paragraph 7) throughout the reaction, and temperature is maintained at 108°–112°F. Two consecutive samples, taken at 1 hour intervals, should give S.F. green dye transmission tests above 27% to indicate completion of the desired level of the cationic group addition;
10. The slurry is then adjusted to pH 5.8–6.2 with 60°Be. sulfuric aicd, filtered and washed;
11. The filter cake is then reslurried to about 22.5°Be. at 60°F., and temperature adjusted to 105°–110°F.;
12. The slurry is then treated with chlorine for about 1 hour at 105°–110°F.;
13. Sodium metabisulfite (dry) is added to the chlorinated slurry and allowed to react for 15 minutes;
14. The slurry pH is then adjusted to 5.2–5.4 with 30°Be. sulfuric acid;

B. GRANULAR AMPHOTERIC
(Net Anionic) Starch Product

15. The modified starch as made above is then adjusted to about 21°Be. at 100°F., and about 100 parts of dry substance modified starch is placed in a reactor to which about 2.6 parts maleic anhydride and 2.2 parts triethylamine are added as set forth below;
16. The sealed reactor tank is purged by bubbling nitrogen through the slurry, and the purge is maintained throughout the maleic anhydride/triethylamine additions;
17. The slurry is agitated vigorously throughout the reaction, which is commenced by adjusting the slurry pH to 6.5–7.0 by the addition of a small amount of triethylamine;
18. The 2.6 parts molten maleic anhydride (130°–170°F.) is added continuously from above the surface of the slurry at a rate such that the total addition time is about 40 minutes;
19. As the maleic anhydride is added, triethylamine is simultaneously but separately added at a rate sufficient to maintain the slurry pH at 6.0–7.0, preferably 6.3–6.7. The slurry pH should not be allowed to fall below pH 6. Triethylamine is added until all of the maleic anhydride has been added;
20. The reaction (with agitation) is allowed to continue for about 4 hours at 95°–100°F. after all of the maleic anhydride has been added;
21. The slurry pH is then adjusted to 3.6–3.8 pH with 30°Be. sulfuric acid, and the nitrogen purge is shut off;
22. The slurry is then filtered, dried and screened;

C. GELATINIZED AMPHOTERIC
(Net Anionic) Starch Product

23. When a pregelatinized product is desired, about 600 pounds of the granular amphoteric (net anionic) starch product obtained from Parts A and B above is slurried in about 139 gallons of water in a jet cooker feed tank such as is described in U.S. Pat. No. 3,067,067 Etheridge et al.;

24. Following the procedure described in the subject patent, the slurried starch product is jet cooked at 250°F. using the shortest possible tail pipe arrangement;
25. The cooked starch paste is collected in a spray drier feed tank, and then spray dried to 5–7% moisture using a Swenson parallel flow spray drier (Swenson Evaporator Company) under the following conditions. Spraying Systems Company nozzle No. 51 insert, core No. 425, 4300 psig atomizing pressure, 2.9 gal per minute feed rate, 6200 standard dubic feet/minute air rate, no cooling air, 450°F. inlet air temperature and 210°F. outlet air temperature;
26. The spray dried, pregelatinized product is then screened through a 20 mesh size vibrating screen (Sweco) from Sweco, Inc., Los Angeles, Calif. and is then ready for packing and shipping to point of use.

The pregelatinized product should be at least about 95% cold water soluble, dry substance basis, and the moisture level should be no greater than 8.0%. The pregelatinized starch product is more convenient to ship and use in paper coatings than the granular starch product, since the granular product must be cooked prior to use, as set forth below. The performance of the pregelatinized starch product in coating colors is equivalent to the granular product in all respects as to coating color viscosity, wet-rub resistance, gloss, brightness, inking characteristics and water retention. The cooking and spray drying do not adversely affect the starch product when it is used to make coating colors, but merely save a step when the coating color formulations are made up.

EXAMPLE II

A cationic quaternary ammonium starch ether, which may be obtained according to the method of Example I above, following U.S. Pat. No. 3,346,563 is then reacted with 2% dry substance basis of maleic anhydride, based on the weight of the starch, using triethylamine as the catalyst. The pH during the reaction was maintained below 7, between 6.0–7.0. The reaction method was similar to that disclosed in U.S. Pat. No. 3,719,664, except that a cationic quaternary ammonium starch ether having a degree of substitution of from 0.0075 to 0.05 was used instead of those starches described in the last mentioned patent. The maleic anhydride reaction is continued until the starch derivative has a net anionic charge. The starch derivative so produced has about 0.2%N (Kjehldahl method) and a free carboxyl content of about 0.2%. The desired range for the degree of substitution of cationic groups is 0.0075 to 0.05 (0.096–0.64%N), and the carboxyl group degree of substitution ranges from 0.018 to 0.0705. The net anionic degree of substitution should be at least equal to or greater than the cationic group degree of substitution (d.s.). The determination for this can be made by simple dye tests. When the substituted starch granules accept methylene blue dye, the product is anionic. In addition, the anionic product will not accept S.F. green dye. Only cationic starches will give a green color using S.F. green dye to stain the granules.

This granular amphoteric (anionic) starch derivative was then used in a coating color having 55% solids which included 16% by weight of a binder of equal parts starch and latex.

The formulation was as follows:

|  | Weight, (Wet basis) |
|---|---|
| No. 2 coating clay (dispersed at 70% solids) | 300 g. |
| Granular amphoteric (anionic) starch, cooked at 95°C./20 min. at 20% solids | 84 g. |
| Carboxylated styrene/butadiene latex (Dow 620 — Dow Chemical Company) | 33 g. |
| Water | 25 g. |
| 80% solids melamine formaldehyde (Parez) 613, American Cyanamid) | 1.7 g. |
| Ammonia used to adjust to pH 8.5 |  |

The above ingredients were mixed together and stirred for 3 hours. Hand drawdowns were then made on coating raw stock using a No. 10 wire wound rod. The coating was then dried for 15 seconds at 200°F. on a Noble & Wood handsheet drum dryer. The sheets were then super calendered, passing through two nips at 200°F., with a linear roll pressure of 300 pounds/linear inch as read on the gage. The coated paper sheets (Sample A) so obtained were tested for wet-rub resistance and compared to coated papers having cationic oxidized starch containing formulations (Sample B) and to deltaprotein containing formulations (Sample C). All of the other ingredients of Sample B and Sample C were the same as for Sample A, and in the same proportions. Table I below is a comparison of wet-rubs for Samples A, B and C.

TABLE I

|  | Sample A | Sample B | Sample C |
|---|---|---|---|
| Wet Rub at 6.5 pH | 98 | 93 | — |
| 7.5 pH | 95 | 83 | — |
| 8.5 pH | 98 | 81 | 95 |

The wet-rub resistance values above 90 are considered an indication of a useful coating formulation. It should be noted that although Sample B (cationic, oxidized starch derivative) exhibited good wet rub resistance at pH 6.5, this property decreased significantly at pH 7.5 to an unacceptable level, and decreased even more at pH 8.5. Because Sample C (delta-protein) could not be coated at pH below about 8, Table I shows no readings for the acid and nearly neutral pH for Sample C (delta-protein) coating formulations.

The wet-rub resistance test procedure, and other test procedures used for evaluating the starch product of this invention are summarized below, immediately following Example V, Table II. In some instances, the tests are standard industry-wide tests, and need no further description. Several of the tests follow the general standard test with minor changes which are believed to make the tests more convenient without comprising accuracy.

Sample A of the present invention was the only one of the three coatings reported in Table I which performed well over the complete pH range of the tests. The superior wet-rub resistance performance of the paper coatings incorporating the maleated starch having quaternary ammonium groups as set forth above is believed to be made possible by the rapid crosslinking which occurs in the coating as it dries to produce substantially complete insolubilization. This highly desirable insolubilization phenomenon is effective over the whole pH range set forth. The coating films are dried without the use of a catalyst. The coated papers of Sample A were equivalent to the Sample C (deltaprotein) coated papers in gloss, brightness and ink tests.

EXAMPLE III

The following coating formula was made up and tested to determine the range of percentage of the anionic starch derivative of the invention which could be used;

|  | Parts, dry basis |
|---|---|
| Predispersed No. 2 coating clay (70% solids) | 100 |
| Sodium hexametaphosphate (Merck & Co.) | 0.05 |
| Amphoteric (net anionic) starch derivative (same as Examples I and II) | 3 |
| Carboxylated styrene/butadiene latex (50% solids) (Dow 638, Dow Chemical Co.) | 14 |
| Melamine formaldehyde insolubilizer (76% solids) (Scripset 101 — Monsanto Chemical Co.) | 0.3 |

The above ingredients were made into a paper coating formulation as follows:
1. The coating clay was dispersed in water containing the sodium hexametaphosphate to make a clay slip at 70% solids level;
2. The amphoteric starch derivative was slurried at 15–35% starch level in water and cooked 20–30 minutes at 200°–205°F. using moderate agitation in a jet cooker such as is described in U.S. Pat. No. 3,067,067;
3. Add cooked starch to clay slip, with sufficient agitation to disperse starch (starch should be maintained at 150°F. prior to addition to clay slip to avoid gelling of the starch product);
4. The temperature of the starch/clay coating is allowed to drop below 150°F., and then the latex, the insolubilizer and water are added to adjust to the desired finished solids level, with moderate agitation throughout;
5. The coating color pH is adjusted to the final desired level (pH 6–9) with ammonia, in the above example the final pH was about 8.5.

The finished coating color was coated on handsheets following the procedure generally as set forth in Example II above, and the coated handsheets tested for wet-rub resistance, gloss, brightness, inking characteristics and water retention. The wet rub tests were above 95 and all of the other tests were at least equal to a comparison d-protein coated handsheet. It is contemplated that melamine formaldehyde may be replaced with glyoxal. However, when glyoxal is used, the finished coating color viscosities tend to be higher and somewhat less stable than those obtained using melamine formaldehyde. The starch derivative of Example III had a d.s. within the ranges described above for both cationic and anionic groups, with a net anionic group d.s. in excess of the cationic d.s.

EXAMPLE IV

Another coating color was made up according to the following proportions:

|  | Parts (dry basis) |
|---|---|
| Predispersed No. 2 coating clay (70% solids) | 70 |
| Sodium hexametaphosphate | 0.035 |
| Calcium carbonate | 30.0 |
| "Composition T" dispersant (a sodium phosphate-type compound available from Calgon Division — Merck & Co.) | 0.15 |
| Amphoteric (anionic) starch, cooked at 95°C./20 min. at 20% solids | 6.0 |
| Carboxylated styrene/butadiene latex (Dow 620 — Dow Chemical Co.) | 12.0 |
| Melamine formaldehyde insolubilizer (70% solids) (Parez 707 — American Cyanamid) | 0.6 |

The above coating color ingredients are prepared as follows:
1. A 70% solids clay slip is prepared by dispersing the coating clay in water containing the sodium hexametaphosphate;
2. Then the calcium carbonate is dispersed in water to which the "Composition T" dispersant has been added to make up a slip at 68% solids;
3. The above slips (Nos. 1 and 2) are dispersed together (using conventional dispersion equipment at a 7.3 dry solids ratio of clay to calcium carbonate). The total solids is then adjusted to 60–65% with water;
4. The cooked amphoteric (anionic) starch is added to the combined slip dispersion and allowed to disperse for a minimum of fifteen minutes;
5. The latex (Dow 620) and insolubilizer are then added, and the solids level is adjusted with water as necessary.

The above coating color was then coated on paper handsheets and evaluated, using handsheets coated with a d-protein base coating color for comparison. The coated handsheets of the invention compared very well with the d-protein base coated handsheets in all important properties, including wet-rub resistance, gloss, brightness, inking characteristics, and water retention. The amphoteric (anionic) starch derivative of this invention may be used as a complete replacement for the more expensive d-protein, and is not acid pH sensitive as are coating colors which include d-protein. Mixtures of the amphoteric (anionic) starch here described with other insolubilizable binders such as d-protein binders and other starches are also contemplated, and the limits on the percentage of the other binders which can be used depends on the conditions of application, including pH, and d.s. levels of the amphoteric (anionic) starch. The excellent rheological properties of coating colors employing the starch derivative of this invention permit application with any kind of a paper coater, including high speed trailing blade, roll coater and airknife.

EXAMPLE V

In another comparison, using the general coating procedure and coating color formulation as set forth in Example II, the amphoteric (anionic) starch based coating color handsheets compared very favorably to handsheets coated with a d-protein based coating color formulation. The observed values are set forth in Table II below:

TABLE II

|  | Starch-based coating color | d-protein based coating color |
|---|---|---|
| Brookfield viscosity of coating colors at: 20 rpm | 2,960 cps. | 2,600 cps. |
| 100 rpm | 1,188 cps. | 940 cps. |
| Coating pH | 8.5 | 8.5 |
| Wet rub resistance (measured as percent transmission of 100 ml. water in which 4 × 4 sample was manually rubbed for 60 seconds) | 98 | 96 |
| IGT-5B ink (ft./min.) | 340 | 305 |
| Gloss, 75° | 50 | 47 |
| Brightness (GE Meter) | 80.1 | 79.5 |
| Water retention, sec. (S.D. Warren test procedure) | 17 | 17 |

All of the above comparisons illustrate that the amphoteric (anionic) starch of the invention performs as well or better than d-protein in coating colors. The d-protein are much more expensive, and, as mentioned above, the protein-based coating colors only coat well at alkaline pH levels, whereas the amphoteric (anionic) starch based coating colors of this invention coat well over a wide pH range from about 6 to 9.5.

Test Procedures

A. WET RUB RESISTANCE

A square of the coated paper, 4 × 4 inches, is placed in a shallow flat pan (photographic development pan), with the coated side to be measuring facing up. Cover the surface of the coating by adding 100 milliliters of distilled water and rub the surface with your fingers for exactly one minute. After rubbing the coating for 1 minute, measure the transmittancy of this wash water with a Spectronic 20 Spectrophotometer made by Bausch & Lomb and compare this reading with distilled water. To make a measurement on it the instrument is adjusted to read 100 with a tube of distilled water. Then when the same tube is inserted filled with the coating wash water, it will read some lesser number on a zero to 100 scale. Any coating which will give a transmittancy reading of 90 or above is generally considered as meeting the requirements of any offset printing press.

B. ALKALI FLUIDITY

1. Unneutralized slurry method. A 20 g. sample, d.s.b. (corrected) of the starch slurry is pipetted into a fluidity beaker. Then 75 ml. of 8.0% (2N) sodium hydroxide is added. The mixture is stirred for 3 minutes to paste the starch. The stirred paste is then transferred to an alkali fluidity funnel and the temperature of the paste is recorded. The alkali fluidity is then determined following the procedure set forth below.

The alkali fluidity test procedure is generally set forth in U.S. Pat. No. 3,238,193 at columns 7 and 8, lines 40–61 and 1–9, respectively. The fluidity funnel employed for the test has a specific "water time" between about 30 to 40 seconds. The water time of the funnel is checked at the beginning of each test by running 100 ml. of pure water through the funnel and recording the total elapsed time. This total elapsed time is used for each sample of alkali-treated starch slurry to be tested. The alkali fluidity is the total amount of the starch sample in ml. which passes through the funnel in the observed water time as determined above.

The alkali fluidity funnel used for the alkali fluidity tests described herein comprises two main parts, a funnel body and a funnel trip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone shaped vessel having a 60° angle (or taper) between opposite, converging funnel walls. Funnel body height is sufficient to hold at least a 100 ml. sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the water-time of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height for the lower end of the funnel body passage to the lower external orifice of the funnel tip includes the height of the ball chamber (0.1008 inches) and the length (0.0492 inches) of the funnel tip opening.

The composite apparatus described above is vertically disposed above a graduated cylinder for the actual tests. At the beginning of each test, the water-time for the apparatus is checked by running 100 ml. of pure water through the funnel and recording the total elapsed time. The water-time then becomes the time against which each sample is tested.

As set forth above in Example I, the alkali fluidity test is used to monitor the acid conversion step of the process. When the target alkali fluidity is reached, the acid conversion step is stopped. The alkali fluidity is then corrected to 77°F. using a chart based on actual experience.

2. Neutralized slurry method. A 20 g. sample, d.s.b. (corrected) of the starch slurry is pipetted into a fluidity beaker after first neutralizing the slurry to 5 pH, filtering and washing it. About 75 ml. of 8.0% (2N) sodium hydroxide is added, and the slurry is stirred for exactly 3 minutes. The stirred paste is then transferred immediately to an alkali fluidity funnel (as described above), and the paste temperature is measured and corrected to 77°F. using a chart based on actual test experience.

C. BROOKFIELD VISCOSITY

Standard test procedure. A number 4 or 5 spindle can be used.

D. IGT INKING CHARACTERISTICS

The standard TAPPI test is used. See TAPPI STANDARD METHOD Number T-499. This test is most important for most coated paper evaluations, because they usually require ink printing in commercial uses.

E. WATER RETENTION

The test and electrical testing apparatus described at TAPPI, Vol. 41, No. 2, February 1958, p. 77–79 is used with the following differences; a standard S.D. Warren retention paper is placed on an aluminum plate, and a brass collar (attached to an ammeter) is placed on the paper. About ¼–½ inches of coating color is poured into the mounted collar and the timer is started. The water retention is the time for the coating color to pass through the test paper under the collar, and cause a current to be recorded by the ammeter.

F. GLOSS

A Gardner Model AUX-4 75° Portable Glossmeter (Gardner Laboratories, Bethesda, Md.) is used following the procedures supplied by the manufacturer.

G. BRIGHTNESS

A brightness tester was used which is manufactured for and in accordance with Standards of The Institute of Paper Chemistry, Appleton, Wis. Manufacturer: The Martin Sweets Co., Louisville, Ky.

H. S.F. GREEN DYE TEST (transmittance)

This test is based on the observed phenomena that the optical transmission of a filtrate of a carefully measured quantity of cationic quaternary ammonium starch slurry to which a carefully measured quantity negatively charged dye stuff has been added can be used to determine the nitrogen content of the cationic starch, which absorbs the S.F. green dye in direct proportion to the nitrogen content of the starch.

The procedure is as follows:

1. 500 ml. of cationic starch slurry is adjusted to pH 4–5 using 15% HCl;
2. the slurry is filtered and washed, and reslurried in 150 ml. of distilled water at 70°–80°F.;
3. a sample of slurry which contains 5 g. of starch dry substance basis is pipetted into a 100 ml. Kohlrausch flask, and 5 ml. of 4.5 pH buffer solution (see Note A below) is added;
4. 5 ml. of light green S.F. dye solution is then pipetted into the flask, and 20 ml. of distilled water is added, so that the flask is about one-half full (see Note B below);
5. the flask is stoppered and shook for about 15 minutes, and then filled with distilled water, stoppered and mixed by hand;
6. two 15 ml. centrifuge tubes are then quickly filled with the mixed slurry from the Kolrausch flash and centrifuged at 2000 RPM (high speed) on an International Clinical Centrifuge, Model CL available from International Centrifuge Company, Boston, Mass., thereby removing the starch granules with the amount of S.F. green dye they have absorbed;
7. the clear liquid resulting from the centrifuge action is transferred to the 5 ml. optical tubes of a Bausch & Lomb Spectronic 20 spectrophotometer and the spectrophotometer is set for a wave length of 630 microns. The transmittance is set for zero with no tubes in the instrument;
8. a tube containing distilled water is placed in the instrument and it is set for 100% transmittance, this calibration step is repeated;
9. the distilled water tube is replaced with the sample tubes in sequence and transmittance readings are taken;
10. the percent transmission readings can then be converted to the percentage nitrogen content in the cationic starch sample. The greater the percent transmission, the greater the amount of S.F green dye which has been removed from the sample by absorption on the nitrogen containing starch granules (which were removed by centrifuging the samples). A graph to facilitate this interpolation from percent transmission to nitrogen content has been prepared. The percent transmission should range from about 27 to 35% to insure a nitrogen content of 0.018% to 0.235% nitrogen, or a cationic group degree of substitution ranging from 0.01 to 0.06, the preferred d.s. for the quaternary ammonium substitution.

NOTE A. The pH 4.5 buffer solution is a mixture of 68 g. sodium acetate trihydrate; 51 g. glacial acetic acid;; and sufficient distilled water to make 500 ml. total solution, which is then shook vigorously to make a solution.

NOTE B. The S.F. green dye is obtained in powder form from Matheson, Coleman and Bell Co., East Rutherford, N.J. under the label "Light Green S.F. Yellowish Dye" at about 89% solids. The S.F. green dye powder is made into an indicator solution for the transmittance test by dissolving 0.792 g. of the powder (as received from the manufacturer) in sufficient water to make up 1,000 ml. of green dye solution. Care must be taken in accurate measurement of the components which enter into the green dye test mixture because it is used to monitor the degree of substitution of quaternary ammonium groups on the cationic starch intermediate (and therefore, on the amphoteric starch end product) used in the coating colors of the invention.

SUMMARY

This new amphoteric (cationic-anionic) starch includes cationic quaternary ammonium groups and sufficient dicarboxyl groups derived from maleic anhydride to produce a net anionic charge on the starch derivative. The product is particularly useful as a total replacement for protein binders in paper and paperboard coating color formulations over a broad pH range from about 6 to 9.5, whereas protein binders normally function at alkaline pH. The starch maleate dicarboxylic groups enable self-crosslinking of the amphoteric starch binder to effect rapid and complete insolubilization without the need for a catalyst when the coating colors are applied to the paper or paperboard substrate.

There is no pigment shock during mixing of the amphoteric starch maleate with the coating clay, and binder migration and leveling problems are avoided during application of the coating color because of the rapid insolubilization caused principally by the amphoteric starch maleate self-crosslinking phenomenon. The coated paper and paperboard substrates made according to the invention have excellent wet rub resistance, high gloss and brightness, and excellent inking characteristics.

The overall range of components of coating color formulations made using the amphoteric (cationic-anionic) starch of the invention is generally as follows for a coating color ranging from 35 to 68% solids level:

A. About 1 to 40 parts, dry substance basis (d.s.b.) of the amphoteric (cationic-anionic) starch based on the weight (d.s.b.) of the clay;

B. About 1–40 parts (d.s.b.) of the latex based on the weight (d.s.b.) of the clay, provided that the weight of latex be at least equal to the weight of the amphoteric starch (d.s.b.) present in the coating color;

C. About 20–98 parts (d.s.b.) of clay based on the total solids of the coating color, which may range from 35 to 68% solids;

D. Balance water (32–65%) and optional components, which may include up to 20% (d.s.b.) of a melamine formaldehyde cross-linker, based on the weight of the amphoteric (cationic-anionic) starch (d.s.b.).

The latex may be selected from the following: styrene/butadienes, polyvinyl acetates, ethylvinyl acetates, acrylic emulsions containing, for example, ethyl and methyl acrylates. As noted above, it is believed important that the amount of the latex, or mixture thereof, be at least equal to the weight of the amphoteric starch in the coating color.

The clays used may be selected from those typically used in paper coating colors, including: No. 1 hydrogloss coating clay; No. 2 coating clay; calcium carbonate; titanium dioxide, delaminated clays, and mixtures of the above. The cationic groups in the amphoteric starch are believed to facilitate adhesion of the coating color to the paper or paperboard substrate.

It can also be appreciated from the example given above that a higher solids level in the formulated coating color may be achieved with the concomitant advantages to the paper mill when the pregelatinized, spray dried starch is used in the coating color. The paper mill does not normally have the water extraction equipment to dry the pasted starch after cooking when the granular product is purchased. The starch mill normally has drum driers, spray driers, and similar equipment, and can conveniently sell the amphoteric starch of this invention in pregelatinized condition.

In addition, it is highly desirable to have at least 70% solids in the clay coating colors, and a high total solids level to avoid the presence of excess water with the drying problems it creates. When the pregelatinized form of the amphoteric (cationic-anionic) starch derivative is used, it is not necessary to add all the water which would otherwise be required to cook the starch (as described in the examples above). Instead, only sufficient water is used to maintain a total solids level at the upper end of the range of 35–68% total solids, preferably about 63–68% total solids in the complete coating color. It is, therefore, a substantial convenience to use the pregelatinized, spray dried amphoteric starch binder of the invention in coating colors formulated as the paper mills.

This amphoteric (net anionic) starch of the invention provides a complete replacement for casein and d-protein coating color binders, it is more economical, and considerably more versatile than binders previously used. It can be used over a broad pH range from about 6–9.5, and when used in spray-dried, pregelatinized form it enables the coating color formulator to increase the total solids level in the coating color up to about 63–68% total solids level. The resulting coating papers and paperboards have excellent wet-rub resistance, gloss brightness, water retention, and inking characteristics, all important properties in a good quality coated paper. The handling qualities of the coating colors during mixing and application are also desirable.

I claim:

1. A coating color composition for paper and paperboard substrates comprising:

a. a coating clay comprising 20–98 parts, dry substance basis, of the total solids of a coating color having 35–68% solids;

b. 1–40 parts, dry substance basis, of the dry substance basis weight of the clay of a cooked amphoteric (cationic-anionic) starch derivative having a cationic group degree of substitution in the range from 0.0075 to 0.05, said cationic groups being derived by the reaction of the starch with chlorohydroxypropyl quaternary ammonium chloride, said amphoteric starch derivative having an anionic group degree of substitution ranging from 0.018 to 0.0705, said anionic groups being derived from the reaction of the quaternary ammonium starch ether with maleic anhydride using triethylamine catalyst; and the ratio of cationic groups to anionic groups is such that the net anionic group degree of substitution is at least equal to the net cationic group degree of substitution; and c. 1–40 parts, dry substance basis, of a latex binder based on the total weight, dry substance basis of the clay, provided that the total weight of said latex is at least equal to the total weight of the amphoteric starch, dry substance basis;

said coating color composition being capable of self-crosslinking insolubilization due to the presence of maleic anhydride.

2. A paper substrate coated with the coating color of claim 1.

3. The coating color of claim 1, in which the amphoteric starch has cationic group degree of substitution in the range of 0.01 to 0.06, and an anionic group degree of substitution at least equal to the cationic group degree of substitution to provide an amphoteric starch binder having a net anionic charge.

4. The coating color of claim 3, including a crosslinker selected from the group consisting of glyoxal and melamine formaldehyde type crosslinkers, said coating color being useful for coating paper substrates over a pH range from 6–9.5.

5. A paper substrate coated with the coating color of claim 4, in which the added crosslinker may be present in an amount up to about 20%, based on the weight of the amphoteric starch, dry substance basis.

6. The coating color of claim 1, in which the latex binder is selected from the group consisting of: styrene/butadiene; polyvinyl acetate; ethyl vinyl acetate; and acrylic emulsions.

7. The coating color of claim 1, in which the coating clay is selected from the group consisting of: No. 1 hydrogloss clay; No. 2 coating clay; calcium carbonate, titanium dioxide; and delaminated clays.

8. The coating color of claim 1, in which the amphoteric starch derivative has been pregelatinized and dried prior to mixing in the coating color.

9. A paper substrate coated with the coating color of claim 8.

10. In a coating color composition for paper and paperboard, a replacement for protein consisting essentially of an amphoteric (cationic-anionic) starch derivative having a net excess of anionic groups, the cationic groups being derived by the reaction of the starch with chlorohydroxypropyl quaternary ammonium chloride to a degree of substitution of quaternary ammonium groups in the range of 0.01 to 0.06, the anionic groups being derived from the reaction of the quaternary ammonium starch ether with maleic anhydride using triethylamine catalyst to a degree of substitution of the maleated carboxyl group of 0.018 to 0.0705, and such that the net anionic group degree of substitution is at least equal to, or greater than, the cationic group degree of substitution, said amphoteric starch derivative being stable over the pH range from 6 to 9.5 when used with a latex binder in a coating color for paper and paperboard said starch derivative being capable of self-crosslinking and rapidly insolubilizing in such paper coating colors without the addition of a crosslinker catalyst.

11. A coating color composition including the amphoteric starch derivative of claim 10 having the following composition:

| Ingredients: | Weight (wet basis) |
| --- | --- |
| Granular amphoteric starch (first cooked at 95°C./20 min. at 20% solids) | 84 g. |
| No. 2 coating clay (70% solids) | 300 g. |
| Carboxylated styrene/butadiene latex | 33 g. |
| Water | 25 g. |
| Melamine formaldehyde (80% solids) | 1.7 g. | said coating color having a pH of about 8.5 adjusted with ammonia.

12. A paper or paperboard coated with the coating color of claim 11, having a wet rub resistance of more than 90 when coated at pHs ranging from 6.5 to about 8.5.

13. A coating color composition including the amphoteric starch derivative of claim 10 having the following composition:

| Ingredients: | Parts, dry substance basis |
| --- | --- |
| Amphoteric starch (pregelatinized, by cooking 20–30 minutes at 200°–205°F. in a jet cooker) | 3 |
| No. 2 coating clay (70% solids) | 100 |
| Carboxylated styrene/butadiene latex (50% solids) | 14 |
| Melamine formaldehyde insolubilizer (76% solids) | .3 |
| Sodium hexametaphosphate | .05 | said coating color having a pH of 6–9 adjusted with ammonia.

14. The coating color of claim 13, applied to a paper or paperboard substrate to provide a coated paper product having a wet rub resistance of at least 95, and excellent gloss, brightness, inking characteristics and water retention.

15. A coating color composition including the amphoteric starch derivative of claim 10 having the following composition:

| Ingredients: | Parts (dry substance basis) |
| --- | --- |
| No. 2 coating clay, predispersed (70% solids) | 70 |
| Calcium carbonate | 30 |
| Carboxylated styrene/butadiene latex | 12 |
| Amphoteric starch (cooked at 95°C./20 min. at 20% solids) | 6 |
| Melamine formaldehyde insolubilizer | 0.6 |
| Sodium phosphate type dispersant (Composition T — Calgon Division, Merck & Co.) | 0.15 |
| Sodium hexametaphosphate | 0.035 | said coating color formulation having a pH of 6–9 adjusted with ammonia.

16. A paper substrate coated with the coating color composition of claim 11 having the following properties:

| | |
| --- | --- |
| Wet rub resistance (measured as percent transmission of 100 ml. water in which a 4 × 4 coated sample was manually rubbed for 60 seconds) | 98 |
| IGT-5B ink (ft./min.) | 340 |
| Gloss, from 75° Glossmeter | 50 |
| Brightness (GE Brightness Meter) | 80.1 |
| Water retention (S.D. Warren Test) | 17 |

* * * * *